(12) United States Patent
Bauer

(10) Patent No.: US 7,837,146 B2
(45) Date of Patent: Nov. 23, 2010

(54) STRUCTURE FRAME

(75) Inventor: Jürgen Bauer, Sulzbach (DE)

(73) Assignee: RECARO Aircraft Seating GmbH & Co. KG, Schwäbisch Hall (DE)

(*) Notice: Subject to any disclaimer, the term of this patent is extended or adjusted under 35 U.S.C. 154(b) by 310 days.

(21) Appl. No.: 11/889,855

(22) Filed: Aug. 16, 2007

(65) Prior Publication Data

US 2008/0048066 A1 Feb. 28, 2008

(30) Foreign Application Priority Data

Aug. 26, 2006 (DE) ............. 10 2006 040 059

(51) Int. Cl.
*B64D 13/00* (2006.01)
(52) U.S. Cl. .............. 244/118.6; 244/118.5; 244/122 R
(58) Field of Classification Search ............. 244/118.6, 244/118.5, 122 R
See application file for complete search history.

(56) References Cited

U.S. PATENT DOCUMENTS

| | | | | |
|---|---|---|---|---|
| 2,674,300 A * | 4/1954 | Liljengren et al. | ............ | 297/37 |
| 4,625,934 A | 12/1986 | Ryan | | |
| 4,674,713 A * | 6/1987 | Ryan et al. | ............. | 244/122 R |
| 4,723,732 A * | 2/1988 | Gorges | ............. | 244/118.6 |
| 4,834,452 A | 5/1989 | Goodrich | | |
| 5,769,360 A * | 6/1998 | Kerbis et al. | ............. | 244/118.6 |
| 5,775,642 A * | 7/1998 | Beroth | ............. | 244/118.6 |
| 5,788,185 A * | 8/1998 | Hooper | ............. | 244/122 R |
| 5,810,290 A * | 9/1998 | Merensky et al. | ........ | 244/118.6 |
| 5,829,836 A * | 11/1998 | Schumacher et al. | ........ | 297/257 |
| 6,375,268 B2 * | 4/2002 | Okazaki et al. | ........ | 297/452.18 |
| 6,769,739 B2 | 8/2004 | Salzer et al. | | |
| 7,073,855 B2 | 7/2006 | Wagner et al. | | |
| 7,354,019 B2 * | 4/2008 | Bauer | ............. | 244/118.6 |
| 7,455,276 B2 | 11/2008 | Frey | | |
| 2002/0195523 A1 * | 12/2002 | Cawley | ............. | 244/118.6 |
| 2003/0189370 A1 | 10/2003 | Hemmer | | |
| 2005/0224651 A1 | 10/2005 | Glockler | | |
| 2005/0269844 A1 | 12/2005 | Abt | | |
| 2007/0018047 A1 | 1/2007 | Wodak | | |
| 2008/0149764 A1 | 6/2008 | Frey | | |
| 2008/0237398 A1 * | 10/2008 | Kennedy et al. | .......... | 244/118.6 |
| 2009/0114794 A1 * | 5/2009 | Rudduck et al. | .......... | 248/503.1 |

FOREIGN PATENT DOCUMENTS

| | | |
|---|---|---|
| DE | 100 19 484 | 10/2001 |
| DE | 103 41 624 | 4/2005 |
| DE | 10 2004 013 878 | 10/2005 |
| DE | 10 2004 019 299 | 12/2005 |
| DE | 10 2004 047 455 A1 | 4/2006 |
| DE | 10 2005 033 048 | 1/2007 |
| WO | WO 02/066284 A1 | 8/2002 |
| WO | WO 2005/035301 A3 | 4/2005 |
| WO | WO 2006/029659 A1 | 3/2006 |
| WO | WO 2006/074522 A1 | 7/2006 |

* cited by examiner

*Primary Examiner*—Christopher P Ellis
(74) *Attorney, Agent, or Firm*—Posz Law Group, PLC

(57) ABSTRACT

The invention relates to a frame structure for erecting seats, such as aircraft passenger seats, on a cabin floor (10) and/or for transport of the seats into and out of the cabin. One base frame (28, 38, 40) is associated with at least one seat. In this way the seat is handled as a modular unit together with the base frame, when installing the seats in the cabin or when removing the seats from the cabin.

8 Claims, 5 Drawing Sheets

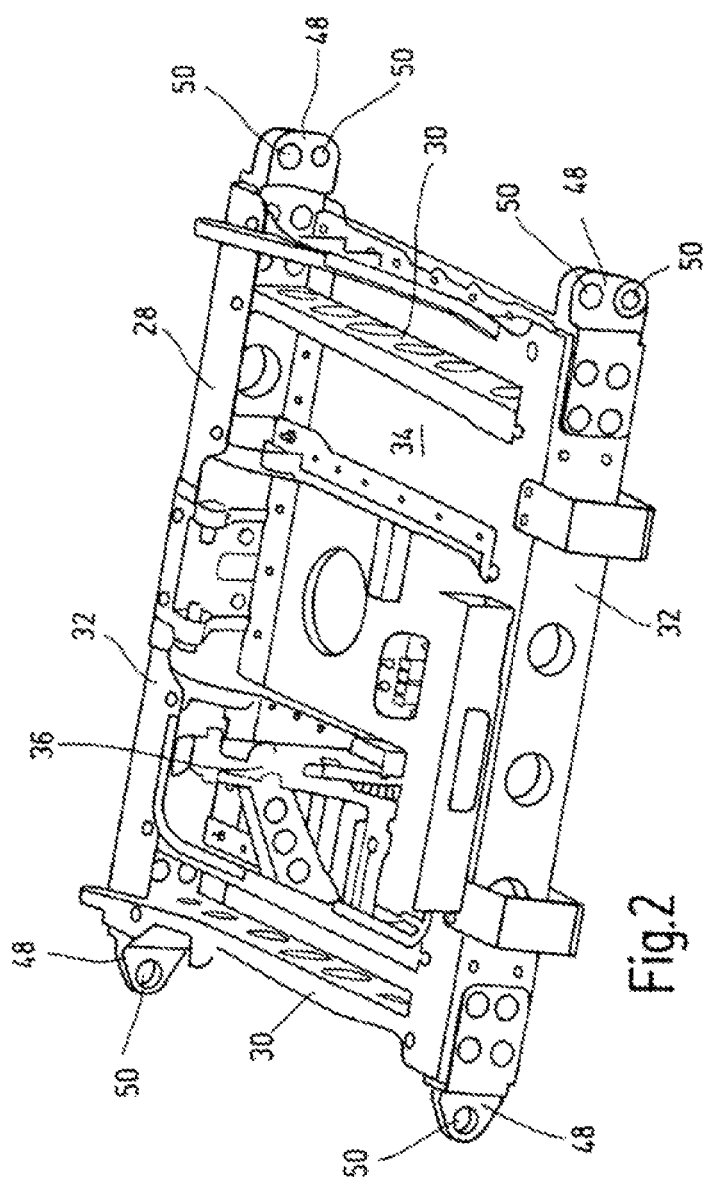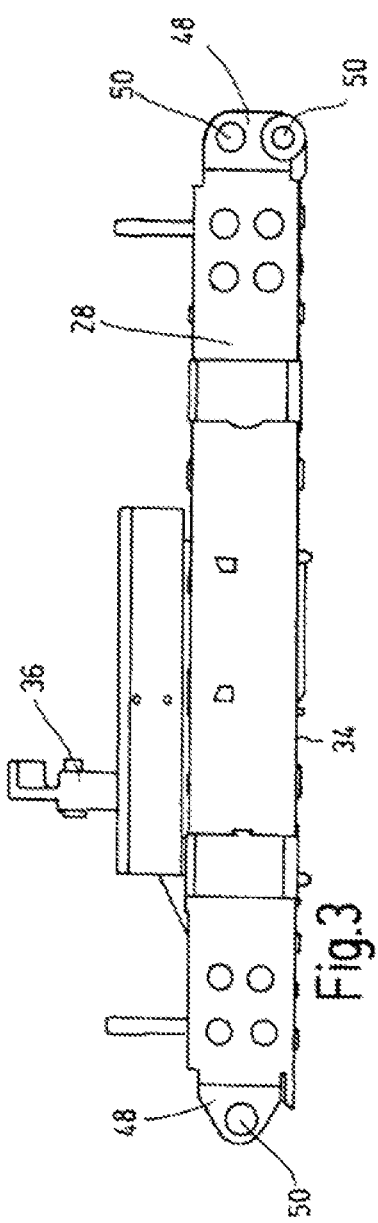

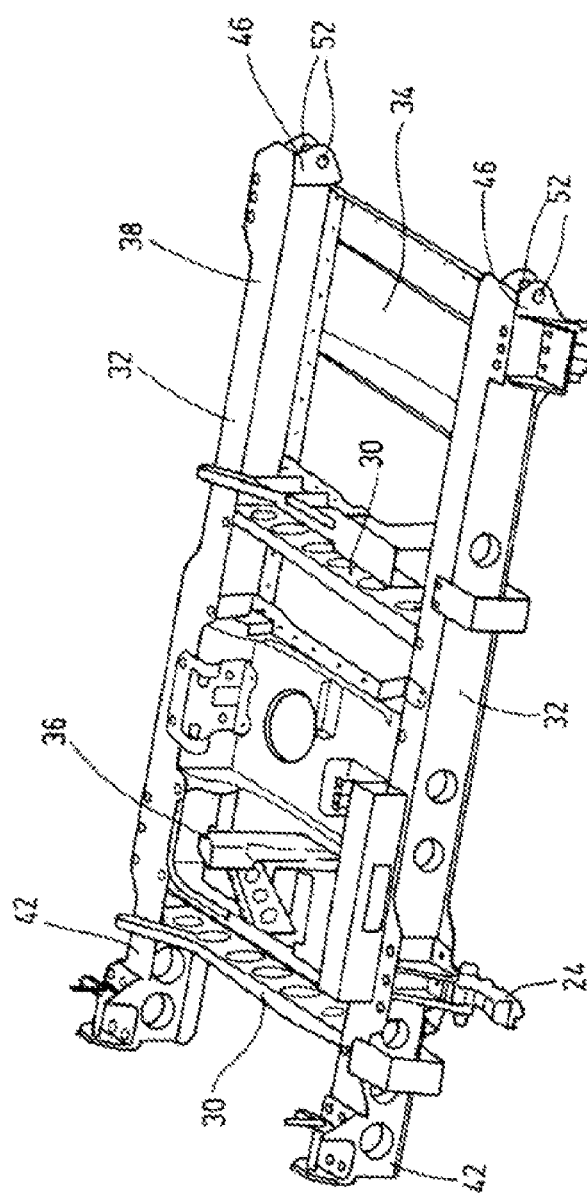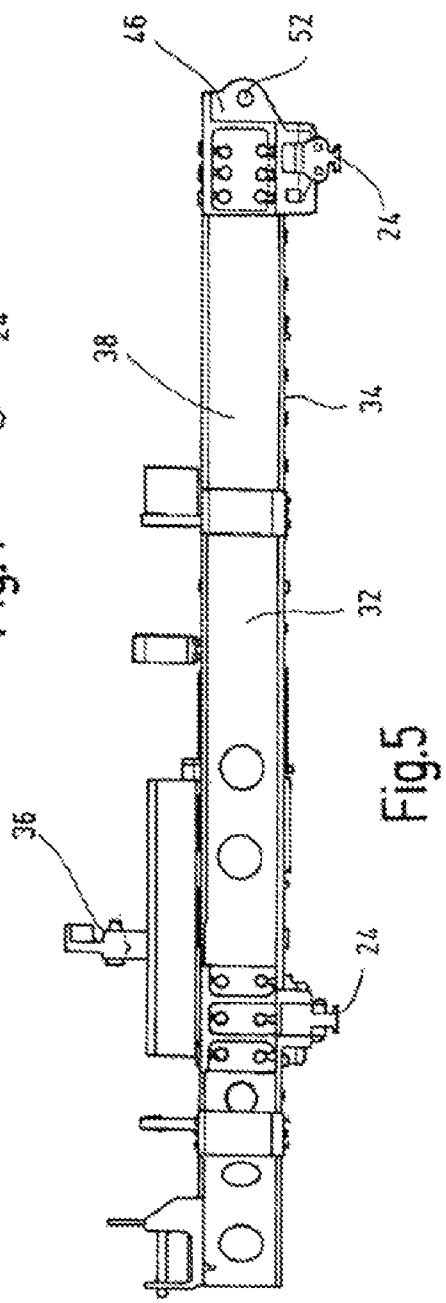

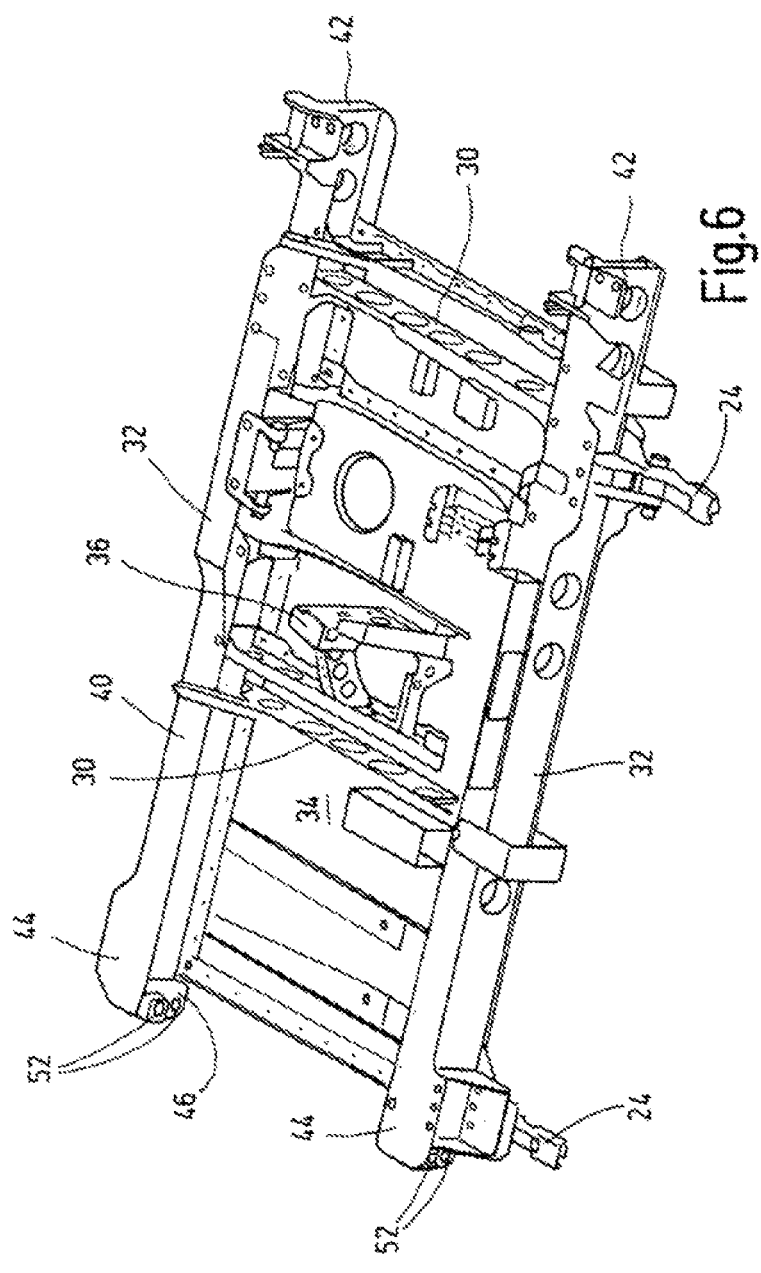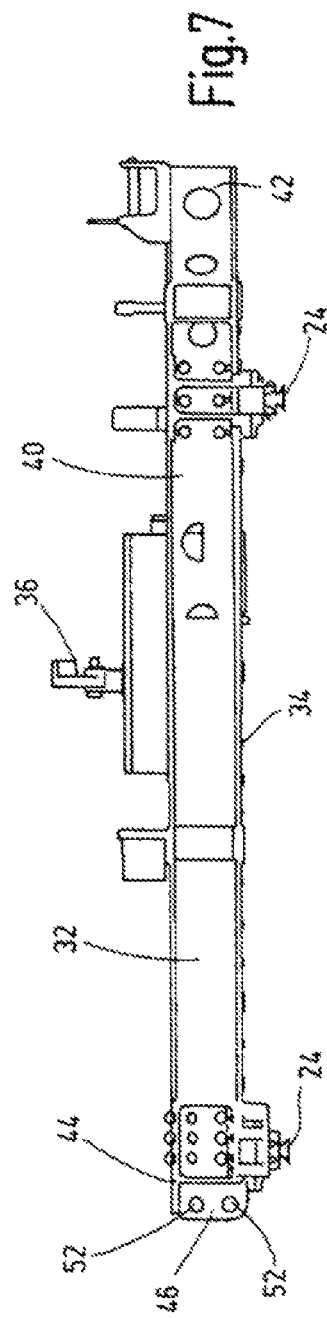

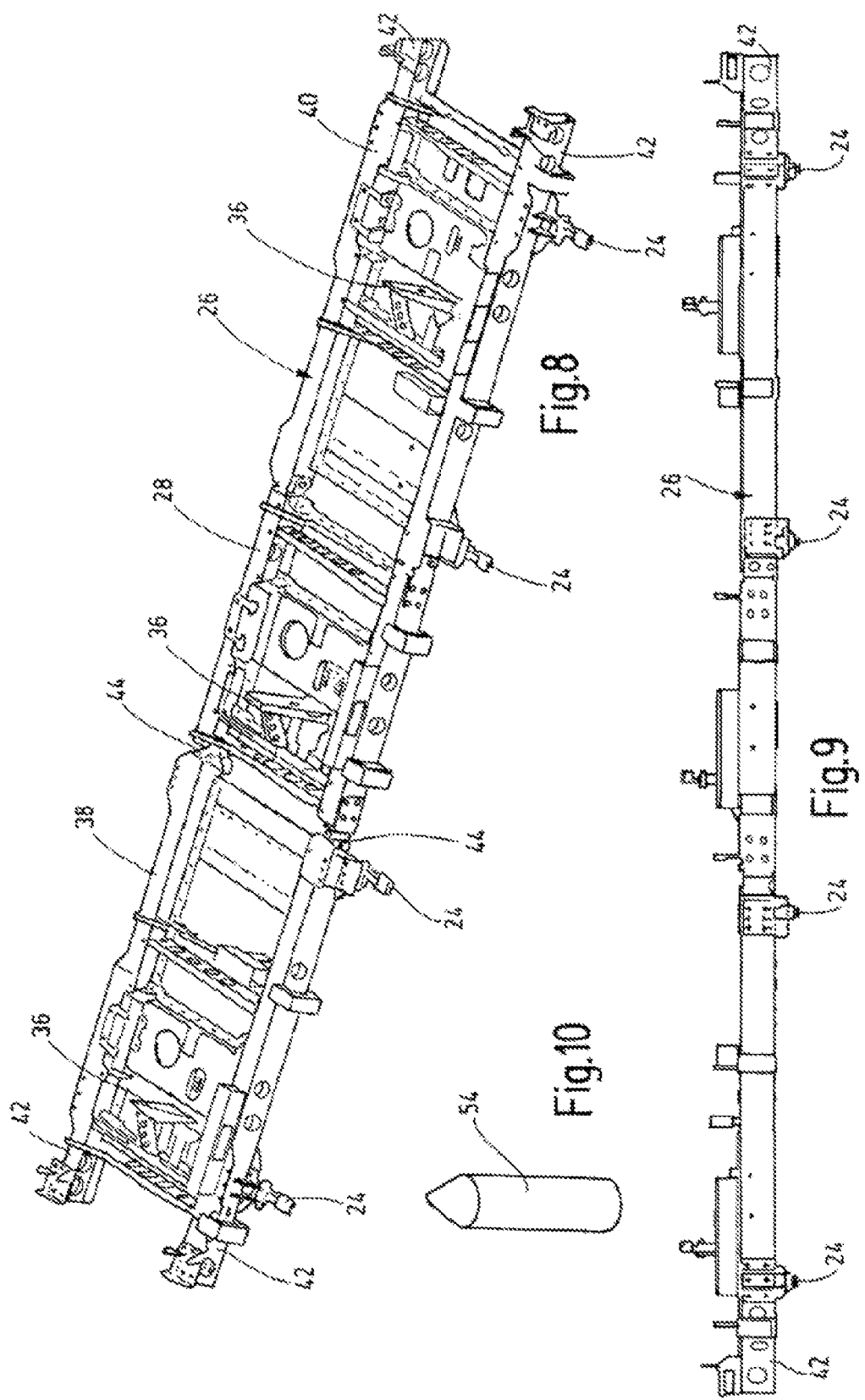

STRUCTURE FRAME

BACKGROUND

The invention relates to a frame structure, especially for erecting seats, such as aircraft passenger seats, on the cabin floor and/or for transport of these seats into and out of the cabin.

Modern aircraft passenger seats as are disclosed, for example, in DE 100 19 484 A1 permit a plurality of movement possibilities and associated degrees of freedom for the individual seat components, such as a seat part, a backrest and an associated leg and foot rest. The known solution is characterized, among other things, in that the actual seat part can be erected on the cabin floor of the aircraft by way of a supporting framework. The supporting framework has a plurality of articulation points, which connect the individual rods of the supporting frame to one another in an articulated manner and accordingly with a capacity to pivot, so that it is possible by way of a suitable control and adjustment means to adjust the entire seat to a plurality of individual positions. For example, it is possible to move the seat from the upright position to a reclining position and vice versa depending on the requirements of the seat occupant and according to given safety criteria. To secure the individual sphere these aircraft passenger seats are often surrounded with a so-called sphere (shell) which also ensures that body parts or articles cannot unintentionally reach the mechanisms of the supporting framework.

To fix the aircraft passenger seats, seat fastening devices, which are also called fittings in the jargon, are used. The fittings are used to fix opposing bottom pairs of legs to longitudinal members of the supporting framework of the seat to mounting rails, which are generally recessed into the cabin floor and are made as a hollow section which is provided on its top facing the passenger seat with a longitudinal channel which is bordered by the free sides of the hollow section and which has through openings which widen its free entry cross section in a definable grid size and which are used for passage of the catch part of a locking body which for relative motion of the respective catch part transversely to the longitudinal axis of the mounting rail can be moved into clamping contact with the sides of the hollow section. Especially advantageously the solution according to DE 10 2004 047 455 A1 uses an eccentric locking drive for this purpose.

In this modular erection concept, each individual seat can optionally be erected with its associated shell part along the mounting rails on the cabin floor and can be fixed in place by means of seat fastening devices, which are described by way of example. If the cabin is to be modified for freight purposes, that is, if the installed seats are to be removed from the cabin or if individual seats have to be replaced due to possible malfunctions or worn seat parts, each individual aircraft passenger seat must be handled in the installation effort. This takes time and therefore generates costs, especially if it is considered that an aircraft out of service cannot generate profits. The known aircraft passenger seat solutions in terms of their basic structure, for example viewed with respect to the supporting framework, can also be made such that they also satisfy increased safety requirements. For example, the seats must withstand a 16 g crash test or, in the torsion of the cabin, which occurs in flight in the longitudinal direction of the aircraft (pitch and roll behavior), the seats must not be adversely affected with regard to stability. If each individual aircraft passenger seat has to be designed according to these criteria, correspondingly high material use is necessary. This leads to increased weight in use and accordingly to a reduction of the profitable payload of the aircraft.

SUMMARY

On the basis of this prior art, therefore the object of the invention is to further improve the known solutions while retaining a high level of seating comfort according to ergonomic aspects such that short rigging and dismantling times can be achieved. Further, low material costs and increased stability taking into account especially the given safety requirements are achieved.

The frame structure according to the invention, which is used especially to erect seats such as aircraft passenger seats on a cabin floor and/or for transport of these seats into and out of the cabin, has at least one base frame associated with each seat. In this way the seat can be easily handled as a modular unit together with the base frame. Especially in a rigging process, the aircraft cabin can be easily provided with seats, but in this way also cleared again by removing the seats from the cabin, for example, because it is needed for freight shipping purposes. The refitting times are especially short if, preferably, on the bottom of the base frame, the seat fastening devices are already present for fixing the seat to the cabin floor by way of the indicated longitudinal rails; however, this is not critically necessary. Likewise it is possible, as already shown in the prior art, to connect the seats to the cabin floor later by way of seat fastening devices, but now with interposition of the respective base frame.

The respective base frame also contributes significantly to the stability of the seat at the same time and if, as is shown in the prior art, a movable supporting framework is used to move the seat components, the respective base frame forms bracing for the supporting framework so that in this respect, even with reduced material use for the bearing parts of the seat, the seats can easily withstand the already mentioned 16 g test. It has also been found that for possible torsion of the cabin in the longitudinal direction during flight, the base frame at least partially takes up such torsion forces and, in this respect, relieves the actual bearing structure of the seat The seat according to the invention therefore satisfies the pertinent safety criteria even if it has a light construction. Since the base frame can be designed as a standardized module, it can be produced especially economically in a large number of pieces. Together with the seat in its entirety, including a shell which may be provided, this yields an easily manageable seat system which in terms of the modular concept helps greatly facilitate erection or removal of all the seats of an aircraft cabin.

The use of the respective base frame as a frame structure need not be limited to use in aircraft cabins, but a corresponding frame concept could also be used for vehicles, especially motor coaches, ferries or the like; fundamentally however, they are also suited for seating in large halls, such as for example performance halls or the like.

In one preferred embodiment of the frame structure according to the invention, to form a row of seats a base frame is detachably connected to at least one adjacent base frame by way of a connection site. Preferably here it is furthermore provided that the respective connection site forms an articulation which preferably allows relative motion of the base frames which are adjacently joined to one another parallel to the longitudinal axis of the aircraft cabin or its cabin floor. In this way it is possible, in order to route transverse forces, therefore occurring largely transversely to the indicated longitudinal axis, with formation of an overall structural frame, to connect the individual frame parts to one another and to effectively counteract the torsion forces which arise in this case, then a base frame being arranged to be pivotal, seen in relative terms, in the longitudinal direction to the other base frame.

If in one preferred embodiment of the frame structure according to the invention the indicated articulations can be locked, it is possible in this respect to handle the frame structure consisting of at least two base frames, preferably together with the associated seats, in the locked base position as a transport unit and only in the rigged situation of use within the cabin to produce the desired degree of freedom for flying with the locking released.

This system has proven especially advantageous for a row with three or more seats, then two adjacent seats with their locked base frame being handled as a transport unit and the remaining seat or seats being handled separately as a further transport unit with the base frame associated at the time as a frame structure.

In another especially preferred embodiment of the frame structure according to the invention, the respective base frame is built as a rectangle of longitudinal and cross members which are opposite in pairs, each cross member forming a possible connection site with the cross member of an adjacent base frame. This structure by way of longitudinal and cross members to a large degree allows bracing for the overall structure of the seat which stands on the base frame in this way.

Other advantageous embodiments of the frame structure according to the invention are the subject matter of the other dependent claims.

BRIEF DESCRIPTION OF THE DRAWINGS

The frame structure according to the invention will be detailed below using one exemplary embodiment as shown in the drawings. The figures are schematic and not to scale.

FIGS. 2 to 7 show the individual base frames in a perspective elevation view and in a facing front view, which, shown in the installation direction, according to an obvious connection, form the frame structure as shown in FIGS. 8 and 9 for seating comprised of three seats according to FIG. 1;

FIGS. 8 and 9 show a representation according to FIGS. 2 to 7 in a perspective elevation view and in a face front view for the entire frame structure;

FIG. 10 shows an exemplary front view of the connecting pin for the illustrated base frames.

DETAILED DESCRIPTION OF THE PREFERRED EMBODIMENT

Figure 1:
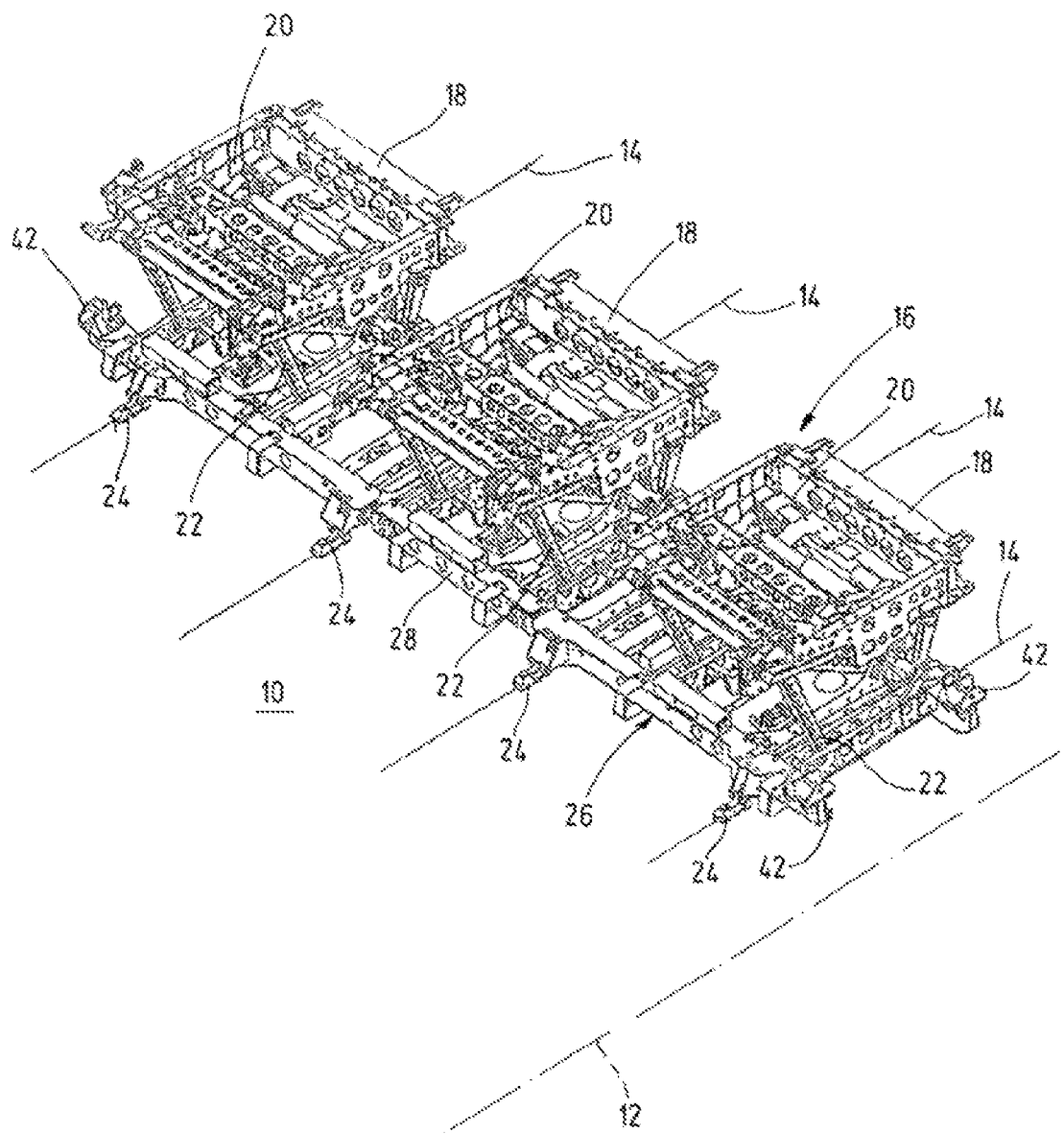
FIG. 1 shows a perspective elevation view of one part of a row of three seats which has been erected on a cabin floor which is shown by way of an extract.

In the perspective view as shown in FIG. 1, 10 refers to the cabin floor of an aircraft cabin which is not detailed. Mounting rails 14 with a flat top are recessed into the cabin floor 10 parallel to the longitudinal axis 12 of the aircraft. By way of these mounting rails 14, seating designated overall as 16 can be fixed. The seating 16 consists of three individual aircraft passenger seats 18, which are located next to one another in the transverse direction. For simplicity, only the seat part 20 is shown, together with a supporting framework 22 located on the bottom. The supporting framework 22 has four upright legs, which are diametrically opposite one another By means of the supporting framework 22, the associated seat part 20 is erected. The supporting framework is movable, and using the corresponding actuators, the supporting framework 22 enables a plurality of adjustment possibilities for the entire aircraft passenger seat (not shown). Both the backrest and also the foot and/or leg rest, in addition to the armrests and a possible shell for the respective aircraft passenger seat 18, have been omitted. Of course these components can be added to the respective aircraft passenger seat 18. Also, the cushions for the seat part 20 are not shown.

The indicated mounting rails 14, on their top side, which faces the respective aircraft passenger seat 18, have passage openings, which are not shown. The mounting rails 14 have distances between one another in a definable grid and are used for passage of catch parts of a locking body 24, which are called seat fitting in the jargon. By means of an eccentric or other locking means, which is not specified, the catch parts of the locking body 24 can be fixed in each respective associated mounting rail 14. Such seat fastening devices are disclosed for example in DE 10 2005 033 048, which was published at a later date, and in DE 103 41 624 A1 of the applicant. While in these known solutions according to the prior art the bottom of the upright legs of the supporting framework 22 are detachably fixed on the cabin floor 10 directly for fixing the respective seat in pairs in the longitudinal direction opposite one another, both in the flight direction and also opposite, this takes place in the solution according to the invention with interposition of a frame structure 26, which is detailed below and which is shown functionally completely both in FIG. 1 and also in FIGS. 8 and 9.

The frame structure 26 is designed to be modular and, for the three-seat arrangements shown in FIG. 1, is composed of a total of three individual modules. A middle base frame 28 is shown in FIGS. 2 and 3. The base frame 28 is built as a rectangular frame consisting of two adjacently opposite longitudinal members 30 and cross members 32. Furthermore this box-like frame on the bottom side is braced via a closing plate 34. The middle base module is made to have a lightweight construction, and is preferably made of aluminum material. Further, the middle base module has a plurality of openings and engagement holes to save weight. Furthermore the base frame 28 on its top bears a braced part 36.

The base frame 28 obtained in this respect can be used as a so-called frame structure 26 for an individual aircraft passenger seat 18. That is, an aircraft passenger seat (not shown) together with the base frame 28 can be handled as a modular unit. In particular, the modular unit can be set up as a transport unit within the cabin and can also be removed again. This is generally the case when the cabin is no longer being used as a passenger compartment but as a shipping compartment for goods or luggage and the like. These articles can appropriately be lashed down by way of the then cleared mounting rails 14 for shipping purposes.

In addition to simplified handling of a seat module built in this way with a base frame 28, there is also an especially torsionally stiff structure for the upright part of the seat part 20 in the form of the supporting framework 22. Based on the frame bracing on the bottom of the upright part for the seat, in this respect also an especially torsionally stiff structure is achieved, and torsional forces (roll and pitch moments), which may be routed into the cabin for example, can be effectively absorbed in this way, and their damaging effect can be limited. If it should be possible to fix the middle base frame 28 made by way of example as a frame structure on the cabin floor 10 via mounting rails 14, it can be provided likewise with fitting elements on its bottom. This is not necessary for the described frame structure as a whole according to the illustrated embodiment as shown in FIG. 1, since in this respect the base frames otherwise guarantee the fixing possibility.

In addition to the middle base frame 28, to produce the grouping of three shown in FIG. 1 for the frame structure 26, a left and a right base frame 38, 40 adjoin one another on either side. The left and right directions relate to the direction of looking at the figures. The left base frame 38 is detailed in FIGS. 4 and 5 and the right base frame 40 in FIGS. 6 and 7. The other frames 38, 40 are designed in a box-type construction, consisting of longitudinal and transverse members 30 and 32, the respective bottom in turn being braced via the closing plate 34. The base frames 38 and 40 also have a part 36 that projects upward.

As further shown in FIGS. 4 to 7, in turn the actual base frame for the base frames 38 and 40 is built as for the middle base frame 28 as shown in FIGS. 2 and 3, but modified in this respect in that, in the direction of the middle base frame 28, the base frame structure of the cross members 32 is lengthened to the outside in the manner of a bridge. The bridge-like extension 42, which extends to the outside, can be used as a fixing means to attach a shell, which is not detailed for the respective aircraft passenger seat 18 or for several aircraft passenger seats located next to one another. The bridge-like extension 44, which projects to the inside on its free end, has one projecting contact part 46 at a time that can be joined to the associated contact parts 48 of the middle base frame 28 on either side.

The middle base frame, as shown in FIGS. 2 and 3, viewed in the direction of the figures, on the left side on its contact part 48 is a passage opening 50. On the right side, on top of one another, there are two passage openings 50. Each passage opening 50 penetrates the associated contact part 48. The passage openings 50, which are located in pairs opposite one another, are flush with one another in the direction of the longitudinal extension of the longitudinal members 30. The respective contact parts 46, 48 can be integrally a component of the cross members 32. In this embodiment, however, the contact parts 46, 48, as angle pieces placed later on the respective base frame 28, are securely connected to the cross members 32.

The contact parts 46 from the left and right base frame 38 and 40 can form a mouth-like enclosure as shown by way of example in FIG. 4. As shown for the right base frame 40, they can be held by a shoulder-like widening of the end of the cross member 32 which is free at the time. In this respect the contact parts 46 have connection openings 52 which on the end side can each be made congruent to produce the overall frame structure 26, with the associated through openings 50 of the other contact parts 48. The base structure which has been assembled in this way for the frame structure 26 is shown in FIGS. 8 and 9.

As the connecting part for joining the contact parts 46, 48 to one another and therefore to connect the different base frames to one another, a locking pin as shown in FIG. 10 is used as the connection part 54. This connection part 54 is provided on its one free end with a conical taper to facilitate insertion of the connecting pin into the associated openings 50, 52. As seen especially in FIGS. 2 and 3, on the right side of the base frame 28 it is possible in an arrangement on top of one another to insert two connecting parts 54 into the contact parts 46 by way of the aligning passage openings 50, 52 on each cross member 32, on the opposing side of the base frame 28 then there being only one such passage possibility for the connecting pin. If the two connecting pins in an arrangement on top of one another are placed in each associated contact part 46, 48, the two base frames 28 and 40 (right base frame) are permanently connected to one another and can be used in this way to transport two adjacent aircraft passenger seats 18.

This double seat arrangement can be moved into and out of the aircraft cabin very easily by means of handling devices, which are not shown. If then first for a seat installation process the left base frame 38 in addition to the pertinent seat 18 is used, then in the manner of a double pallet the other components of the three-seat row follow in the form of two seats 18 which are connected to one another. If a pair of pins as the locking part 54 is removed at the connecting point of the base frame 28 with the right base frame 40 from each of the contact parts 46, 48, only one pair of pins remains and the pair of pins which has been released can be used to connect the left base frame 38 to the middle base frame 28 via the corresponding openings 50, 52. The pair of pins which is removed from the connecting site of the base frame 28 to the base frame 40 from the contact parts 46, 48 consists of front and rear pins and is removed either only as a lower or only as an upper pair of pins in order not to lose the degree of freedom of rotation in the illustrated sense. Pins inserted into the receivers should then be arranged opposite in the horizontal plane in order to enable the illustrated rotation.

A single-pair pin connection on both sides of the base frame 28 is shown for example in FIGS. 8 and 9. Since the respective locking part 54 in the form of the connecting pin forms a type of articulation with one possible degree of freedom parallel to the longitudinal axis of the cabin floor 10 or to the longitudinal axis 12 of the aircraft, a free tilt setting of the base frame 28, 38 and 40 parallel to its longitudinal members 30 is possible. If the aircraft cabin now twists, and therefore the cabin floor 10, in this respect the base frame can follow the respective torsion motion (pitch and roll), and still at the same time the cabin can contribute further bracing and to increasing the upright stability of the respective aircraft passenger seat. Axial movement of the connecting part 54 in the direction of the longitudinal axis 12 of the aircraft is stopped by known safeguarding means which are not detailed and which act on the connecting pin. With the seat frame concept according to the invention, it is possible to also satisfy increased certification requirements. In this way the newer so-called 16 g forward test calls for shifting the seat sideways 10.degree. out of the flight direction, then the seat base being "rolled" by 10.degree. with the front and rear seat fitting and afterwards the nearest seat base being "pitched" around the rear seat fitting by 10.degree. down, so that three-dimensional torsion of the entire seat forms which can be reliably absorbed by the base frame concept according to the invention, especially consisting of three individual base frames.

The seating can be dismounted in the reverse sequence and the connecting pin, which has been removed from the receivers between the left base frame 38 and the middle base frame 28, can be inserted again into the opening 50, 52, which is now open between the right base frame 40 and the middle base frame 28 for locking of the pertinent frame. To prevent these locking parts from being placed offset to one another at this point in the mobility position, color markings (not shown) on the respective contact parts 46, 48 help counteract this wrong operation. Safeguarding the pin-like connecting part 54 via link chains or other straight safeguarding elements is precluded due to possible rattling noise and otherwise it must be ensured in any case that loose parts cannot travel into the actuating mechanisms for the seat 18.

The described connection simulation can also be undertaken between two individual base frames; likewise in this way two base frame structures can be connected to one another to form rows of four seats. Based on the illustrated arrangement as shown in FIGS. 1 to 10, it is moreover possible not to provide any fittings for the middle base frame 28 since in this respect the seat fastening devices 24 for the left and right base frames 38 and 40 enable fixing to the cabin floor 10 by way of the mounting rails 14. The connecting pin could also be replaced by other connecting parts which are not shown and which then made optionally as a multiple joint allow more than only one degree of freedom of motion for the frame.

The invention claimed is:

1. A frame structure for erecting seats on a cabin floor or for transport of the seats into and out of a cabin, comprising:
   a first base frame associated with a first seat;
   at least a second base frame associated with a second seat; and
   a connecting part for connecting the first base frame and the second base frame, wherein the connecting part forms an articulation, and wherein the articulation has an articulation axis that is parallel to the cabin floor, wherein
   the articulation allows relative motion of the base frames, which are adjacently joined to one another, in at least one direction, and
   the relative motion consists of a pivoting motion in a direction about the articulation axis of the two adjacently joined base frames.

2. The frame structure according to claim 1, wherein the first base frame is adjacent to the second base frame, and the first base frame is detachably connected to at least the second base frame by a connection point.

3. The frame structure according to claim 1, wherein the articulation that connects the first base frame and the second base frame can be at least partially locked by a locking device.

4. The frame structure according to claim 1, wherein each of the base frames is a rectangle of longitudinal and cross members, which are oppositely paired, and wherein each cross member forms the articulation with the cross member of an adjacent base frame.

5. The frame structure according to claim 1, wherein at least one part of the base frames can be connected via fasteners with longitudinal rails that are on or in the cabin floor.

6. The frame structure according to claim 1, wherein the connecting part is constructed for pivotal motion about the articulation axis.

7. The frame structure according to claim 3, wherein:
   the articulation is a first articulation,
   the frame structure frame further comprises a third base frame associated with a third seat,
   the third base frame is connected to the second base frame by a second connecting part that forms a second articulation, and
   at least one member of one of the first and second articulations, which can be separated from said one of the first and second articulations, serves as a locking device for locking the other of the first and second articulations.

8. The frame structure according to claim 6, wherein the connecting part is formed by a connecting pin, which can be reversibly inserted into two openings of two adjacent base frames, wherein the two openings are arranged congruently one behind the other.

* * * * *